United States Patent
Yang

(10) Patent No.: US 8,960,053 B2
(45) Date of Patent: Feb. 24, 2015

(54) MANUAL DRIVING DEVICE HAVING FUNCTIONS OF TURNING INPUT DIRECTION AND GENERATING IDENTIFICATION SOUND

(76) Inventor: Tai-Her Yang, Dzan-Hwa (TW)

( * ) Notice: Subject to any disclaimer, the term of this patent is extended or adjusted under 35 U.S.C. 154(b) by 747 days.

(21) Appl. No.: 12/909,932

(22) Filed: Oct. 22, 2010

(65) Prior Publication Data

US 2012/0096987 A1 Apr. 26, 2012

(51) Int. Cl.
- *F16H 3/00* (2006.01)
- *A63B 21/00* (2006.01)
- *A63B 23/035* (2006.01)
- *B62M 11/00* (2006.01)
- *B62J 3/00* (2006.01)
- *A63B 22/20* (2006.01)
- *A63B 71/06* (2006.01)

(52) U.S. Cl.
CPC .............. *A63B 21/15* (2013.01); *A63B 23/0355* (2013.01); *B62M 11/00* (2013.01); *B62J 3/00* (2013.01); *A63B 22/20* (2013.01); *A63B 2071/0625* (2013.01)
USPC .......................................... 74/810.1; 475/12

(58) Field of Classification Search
USPC ................... 74/810.1, 810.2, 810.3; 280/259; 475/12, 254
See application file for complete search history.

(56) References Cited

U.S. PATENT DOCUMENTS

| | | | | |
|---|---|---|---|---|
| 4,061,292 A | * | 12/1977 | Whitney | 242/356.7 |
| 4,264,314 A | * | 4/1981 | Imamura | 474/205 |
| 5,662,009 A | * | 9/1997 | Palmer | 74/810.1 |
| 5,881,609 A | * | 3/1999 | Palmer | 74/810.1 |
| 5,970,822 A | * | 10/1999 | Jung et al. | 74/810.1 |
| 6,173,801 B1 | * | 1/2001 | Kakutani et al. | 180/220 |
| 6,263,992 B1 | * | 7/2001 | Li | 180/206.3 |
| 6,695,332 B1 | * | 2/2004 | Kang | 280/237 |
| 6,988,739 B2 | * | 1/2006 | Guderzo et al. | 280/260 |
| 7,090,160 B2 | * | 8/2006 | Morimoto et al. | 242/307 |
| 7,156,780 B1 | * | 1/2007 | Fuchs et al. | 482/92 |
| 7,159,881 B2 | * | 1/2007 | Guderzo et al. | 280/260 |
| 7,223,189 B2 | * | 5/2007 | Guderzo et al. | 474/70 |
| 7,243,937 B2 | * | 7/2007 | Ishikawa | 280/288.4 |
| 7,383,103 B2 | * | 6/2008 | Guderzo et al. | 701/1 |
| 7,532,968 B2 | * | 5/2009 | Kadota | 701/55 |
| 8,143,823 B2 | * | 3/2012 | Yang | 318/280 |
| 8,297,636 B2 | * | 10/2012 | Yang | 280/219 |
| 8,328,214 B2 | * | 12/2012 | Yang | 280/241 |
| 8,330,400 B2 | * | 12/2012 | Yang | 318/400.01 |
| 2010/0090623 A1 | * | 4/2010 | Yang | 318/14 |
| 2010/0154585 A1 | * | 6/2010 | Yang | 74/810.1 |

* cited by examiner

Primary Examiner — Troy Chambers
Assistant Examiner — Zakaria Elahmadi
(74) Attorney, Agent, or Firm — Bacon & Thomas, PLLC

(57) ABSTRACT

A manpower-driven device has a bi-directional rotational input for providing output to the input end of a constant rotating direction output transmission device, which is used to drive a loading wheel train, wherein the direction of the driving input can be freely selected by the user. The manpower-driven device includes a rotation direction detection device and a sound generator whose sound output depends on the detected rotation direction.

21 Claims, 4 Drawing Sheets

MANUAL DRIVING DEVICE HAVING FUNCTIONS OF TURNING INPUT DIRECTION AND GENERATING IDENTIFICATION SOUND

BACKGROUND OF THE INVENTION (a) Field of the Invention

The present invention discloses a device being able to do bi-directional rotation of positive or reverse rotation by both or one of the human hand or foot for driving the input end of the manpower-driven input device and further through the output end of the manpower-driven input device to the input end of the constant rotating direction output transmission device to provide constant rotating direction output via the output end of the constant rotating direction output transmission device for driving the loading wheel trains, wherein the present invention can be applied in bi-directional manpower-driven carriers including foot pedaling driven vehicles, or hand rotating driven vehicles, or both or one of the pedaling and hand rotating driven vehicles; or can be applied in bi-directional manpower-driven sport devices including foot pedaling driven vehicles, or hand rotating driven vehicles, or both or one of the pedaling and hand rotating driven vehicles; one further characteristic of the present invention is that a rotation unit, capable of performing positive and reverse rotations, from a manpower input device which can drive in positive and reverse rotations to a bi-direction input constant rotating direction output device, is installed with a contact-type or non-contact type rotating direction detection device for generating identification sound for the driving rotating direction during the driving period.

(b) Description of the Prior Art

We all know that the bicycle rider is always pedaling in constant directions using the relevant muscles and joints periodically and constantly; i.e part of the muscles and joints of pedaler's body are always at force exerting and receiving statuses, while the other part of muscles and joints of the pedaler's body are always at non-force exerting and receiving statuses; therefore, loading on the human body is unevenly distributed, and the rider may incur sport hazard due to tiredness of longtime stepping movement, and when bi-directionally riding, orientation may be misinterpreted without warning sound for riding direction.

SUMMARY OF THE INVENTION

The present invention discloses a manpower-driven device having a particular man-power driven device being able to do bi-directional rotational input having its output ends for providing output to the input ends of the constant rotating direction output transmission device, while the constant rotating directional output is used to drive the loading wheel train via the output end of the constant rotating direction output transmission device, wherein the direction of the driving input can be freely selected by the user, and it is characterized in that being provided with a function of generating identification sound for the driving rotating direction during the riding period.

DESCRIPTION OF MAIN COMPONENT SYMBOLS

Figure 1:
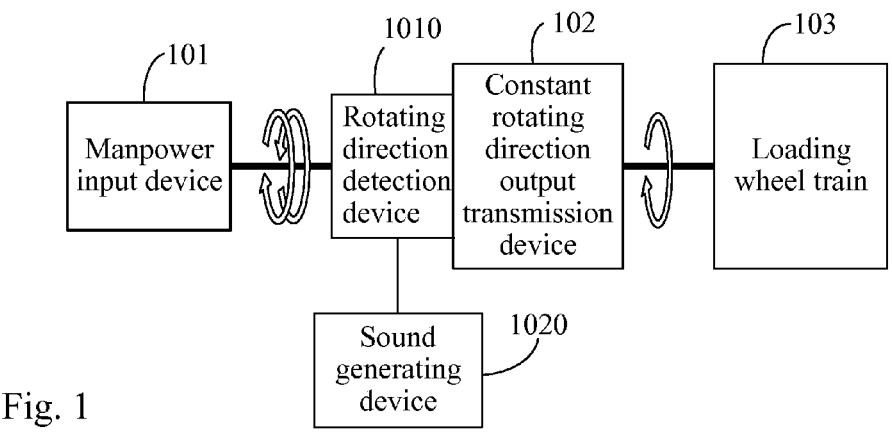
FIG. 1 is a basic block schematic view of the manual driving device having functions of turning input direction and generating identification sound of the present invention.

101: Manpower input device
102: Constant rotating direction output transmission device
103: Loading wheel train
104: Transmission device
105: Externally installed operatively controllable damping device
106: Loading wheel train of fixed damping
107: Loading wheel train of operatively controllable damping
112: Externally installed fixed damping device
1010: Rotating direction detection device
1020: Sound generating device

DETAILED DESCRIPTION OF THE PREFERRED EMBODIMENTS

The present invention discloses a device being able to do bi-directional rotation of positive or reverse rotation by both or one of the human hand or foot for driving the input end of the manpower-driven input device and further through the output end of the manpower-driven input device to the input end of the constant rotating direction output transmission device to provide constant rotating direction output via the output end of the constant rotating direction output transmission device for driving the loading wheel trains, wherein the present invention can be applied in bi-directional manpower-driven carriers including foot pedaling driven vehicles, or hand rotating driven vehicles, or both or one of the pedaling and hand rotating driven vehicles; or can be applied in bi-directional manpower-driven sport devices including foot pedaling driven vehicles, or hand rotating driven vehicles, or both or one of the pedaling and hand rotating driven vehicles.

The present invention discloses a manpower-driven device having a particular man-power input device being able to do bi-directional rotational input having its output ends for providing output to the input ends of the constant rotating direction output transmission device, while the constant rotating directional output is used to drive the loading wheel train via the output end of the constant rotating direction output transmission device, wherein the direction of the driving input can be freely selected by the user, and it is characterized in that being provided with a function of generating identification sound for the driving rotating direction during the riding period.

FIG. 1 is a basic block schematic view of the manual driving device having functions of turning input direction and generating identification sound.

As shown in FIG. 1, it mainly consists of:

The manpower input device (101): it is constituted by the bi-directional rotation output mechanism which receives the positive or reverse bi-directional rotation or reciprocation driving input by both or one of the hand or foot of human body to produce the selected speed ratio and corresponding positive or reverse rotation, including constituted by the pedal, crankshaft and bi-directional rotation transmission wheel train, or constituted by the handle, handle shaft, and bi-directional rotation transmission wheel train, or constituted by the conventional manpower-driven mechanism using manpower to produce bi-directional rotation driving.

The input kinetic energy to drive the first driven rotating direction and the second driven rotating direction comes from both or one of the human hand or foot for driving the input end of the manpower input device (101).

The first driven rotating direction is contrary to the second driven rotating direction.

The constant rotating direction output transmission device (102): The constant rotating directional transmission device (102) directly, or through the transmission device, receives different rotating directional energy from the manpower input device (101) so as to output the kinetic energy in constant rotating direction; wherein the internal transmission component of the constant rotating direction output transmission device (102) are constituted by one or more than one kind of transmission components including: 1) gear train; or 2) friction wheel train; or 3) chain and chain sprocket train; or 4) belt and belt wheel train; or 5) transmission crankshaft and wheel train; or 6) fluid transmission device; or 7) electromagnetic transmission device, etc., wherein if the constant rotating directional transmission device (102) is driven by the inputs of the first driven rotating direction and second driven rotating direction in different rotating directions, the speed ratio of the constant rotating direction between the one at input end and the one at the output end is the same or different or a variable speed ratio.

The loading wheel train (103): It is the wheel train type load being directly driven by the constant rotating direction output transmission device (102) or being driven in the constant single directional rotation via the transmission device.

Figure 2:
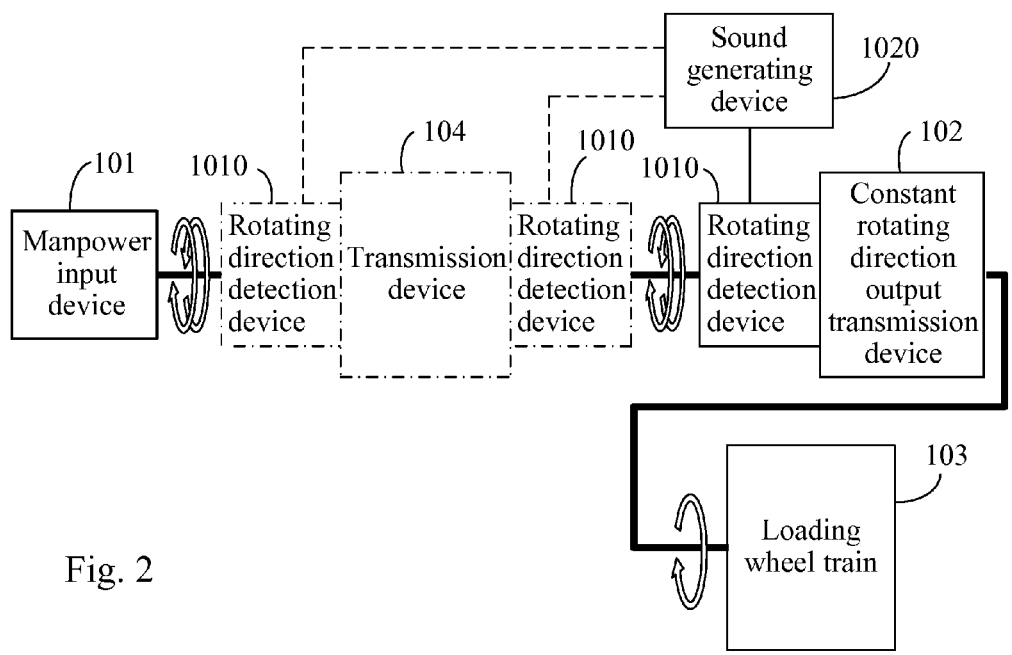
FIG. 2 is a block schematic view showing that the driving device in FIG. 1 is additionally installed with a transmission device (104) between the manpower input device (101) and the constant rotating direction output transmission device (102).

The main characteristic thereof is being installed with:

Rotating direction detection device (1010): which is a controlling structure having a rotating direction detection function and capable of actuating or terminating operations of the sound generating device (1020), and including a rotating direction detection device composed of a physical structure, e.g. a rotating direction detection structure composed of at least one of mechanical, electromechanical, or photoelectric, electromagnetic effects, said rotating direction detection device (1010) is installed in the driving device at the location capable of detecting the rider's driving direction;

Sound generating device (1020): constituted by one or more than one kind of following sound generating structures: 1) a mechanical sound generating device; 2) a sound generating device composed of power, solid electronic type sound simulation circuit and speakers; 3) a sound generating device capable of storing and playing sound signals; 4) a sound signal playing device connected through wireless internet; 5) a mechanical-driven device for generating sound; 6) a mechanical music box; 7) a sound generating device programmed with certain musical compositions which are repeatedly displayed; 8) a sound generating device programmed with two or more than two certain musical compositions; 9) a sound generating device in which sound being generated via random numbers, and being controlled by the rotating direction detection device for correspondingly generating sound while being driven at a certain rotating direction or generating different sounds while being bi-directionally driven;

The mentioned sound generating device (1020) includes fixed sound volume or adjustable sound volume;

The mentioned rotating direction detection device (1010) being connected with the sound generating device (1020) through one or more than one connections means which consists of:

1) the connection between the rotating direction detection device (1010) and the sound generating device (1020) includes a mechanical connection;
2) the connection between the rotating direction detection device (1010) and the sound generating device (1020) includes a connection via the electric power conductive member;
3) the connection between the rotating direction detection device (1010) and the sound generating device (1020) includes connections through wireless, radio frequency, optical or sound wave transmissions;
4) the rotating direction detection device (1010) and the sound generating device (1020) being integrally formed as a linked member for identifying direction and generating sound;
5) the rotating direction detection device (1010) and the sound generating device (1020) being integrally formed as a linked member, and including installed with a rotating direction identification single-way transmission device between the rotating input end and a beating stick, enabling a beat-to-sound part to generate sound through being beaten by the beating stick linked via setting the rotating direction;
6) the rotating direction detection device (1010) and the sound generating device (1020) being integrally formed as a linked member, and including a single-way transmission device installed between the rotating input end and a beat-to-sound part, enabling the beat-to-sound part to be linked at a certain rotating direction for hitting on a fixed beating stick for generating sound;

The human power driving device having input rotating direction identification sound of the present invention includes the application for the bi-directional rotation manpower driven carrier being driven by both or one of the human hand or foot, wherein the manpower input device (101) is driven by both or one of the human hand or foot for positive or reverse rotation, a transmission device (104) is additionally installed between the output end of the manpower input device (101) and the constant rotating direction output transmission device (102), the output end of the constant rotating direction output transmission device (102) performs constant rotating direction output, and the constant directional rotating kinetic energy output is used to drive the loading wheel train (103);

FIG. 2 is a block schematic view showing that the driving device in FIG. 1 is additionally installed with a transmission device (104) between the manpower input device (101) and the constant rotating direction output transmission device (102);

As shown in FIG. 2, wherein the transmission device (104) includes constitution of one or more than one kind of transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission, while the manpower input device (101) is driven by both or one of the human hand or foot for positive or reverse rotation to provide output of relative directional rotation at selected speed ratio.

Figure 3:
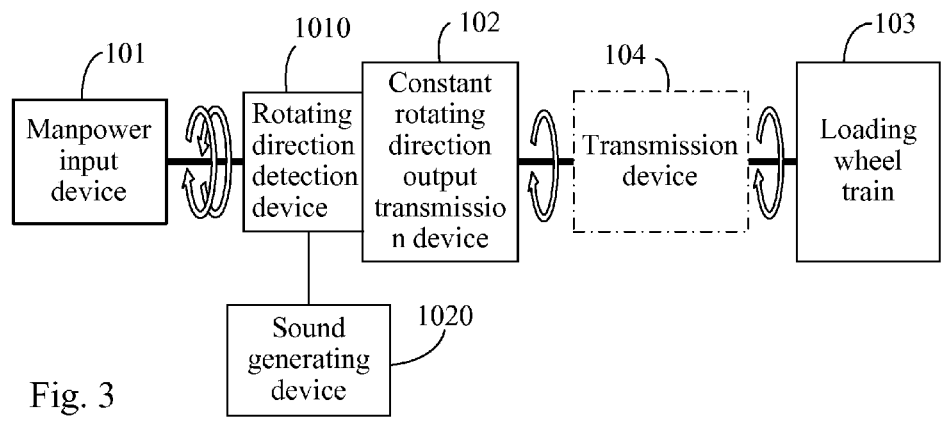
FIG. 3 is a block schematic view showing that the driving device in FIG. 1 is additionally installed with a transmission device (104) between the constant rotating direction output transmission device (102) and the driven loading wheel train (103).

In the manual driving device having functions of turning input direction and generating identification sound of the present invention, a transmission device (104) is further installed between the constant rotating direction output transmission device (102) and the loading wheel train (103);

FIG. 3 is a block schematic view showing that the driving device in FIG. 1 is additionally installed with a transmission device (104) between the constant rotating direction output transmission device (102) and the loading wheel train (103);

As shown in FIG. 3, wherein the transmission device (104) includes the constitution of one or more than one kind of transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission.

Figure 4:
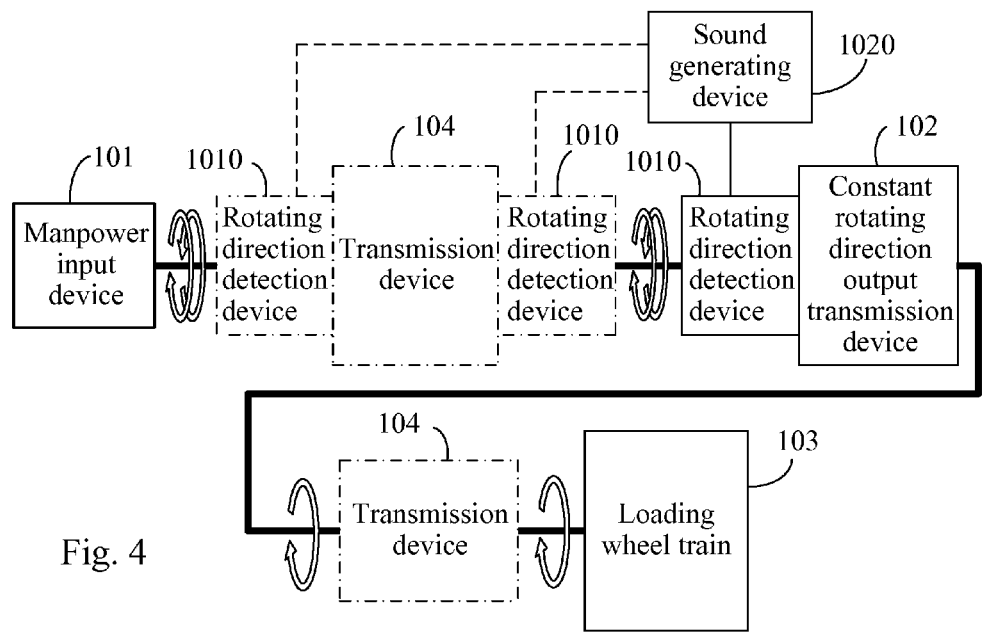
FIG. 4 is a block schematic view showing that the driving device in FIG. 1 is additionally installed with a transmission device (104) between the manpower input device (101) and the constant rotating direction output transmission device (102) as well as between the constant rotating direction output transmission device (102) and the driven loading wheel train (103).

In the Manual driving device having functions of turning input direction and generating identification sound of the present invention, a transmission device (104) is respectively installed between the manpower input device (101) and the constant rotating direction output transmission device (102), and between the constant rotating direction output transmission device (102) and the loading wheel train (103);

FIG. 4 is a block schematic view showing that the driving device in FIG. 1 is additionally installed with a transmission device (104) between manpower input device (101) and the constant rotating direction output transmission device (102) as well as between the constant rotating direction output transmission device (102) and the loading wheel train (103).

As shown in FIG. 4, wherein the transmission device (104) includes the constitution of one or more than one kinds of transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or (4) the clutch device or the single way clutch being operated manually, or by the mechanical force, or electromagnetic force, or fluid force, or centrifugal force, or rotating torque, or counter-rotating torque for connecting transmission or interrupting transmission.

Figure 5:
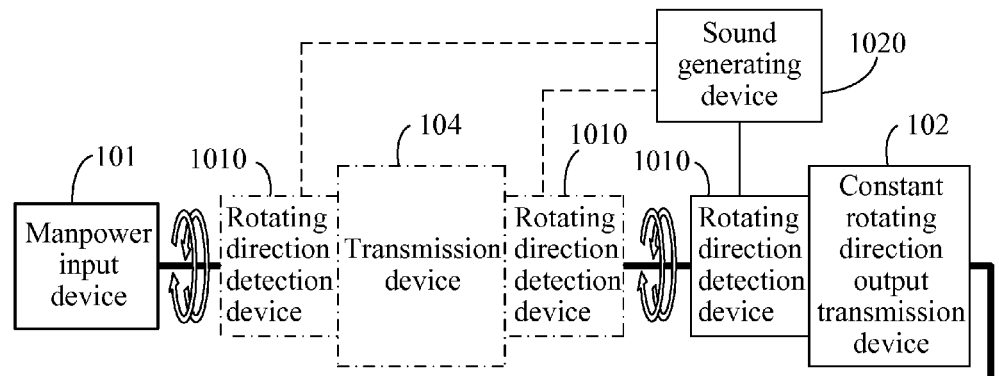
FIG. 5 is a structural block schematic view of the invention being applied in a manpower driven sport device having the loading wheel train of fixed damping.
Figure 5:
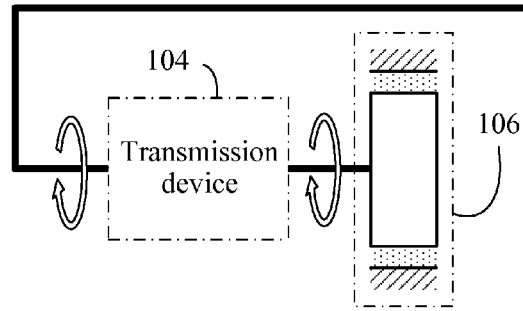

The manual driving device having functions of turning input direction and generating identification sound of present invention can be further applied in manpower driven sport devices, such as sporty exercising bicycles, such as that FIG. 5 is a structural block schematic view of the invention being applied in a manpower driven sport device having loading wheel train of fixed damping, wherein it includes the constitution of the manpower input device (101) being driven by both or one of the human hand or foot for positive or reverse rotation and having at least one constant rotating direction output transmission device (102) with the input ends whereof to directly receive or through the transmission device (104) to receive the rotational kinetic energy output from the manpower input device (101), so that the loading wheel train of fixed damping (106) is therefore directly driven or driven via the transmission device (104) by the rotational kinetic energy output of the constant rotating direction output from the output end of the constant rotating direction output transmission device (102), wherein the transmission device (104) includes the constitution of one or more than one kind of transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission, while the loading wheel train of fixed damping (106) itself has a fixed damping for generating fixed damping during the operation of the sport device;

The fixed damping of aforesaid loading wheel train of fixed damping (106) includes the constitutions of friction type, fluid type, counter-torque of power generation output type, electrical counter-torque type, or electromagnetic eddy current generating type fixed damping structures, etc.

Figure 6:
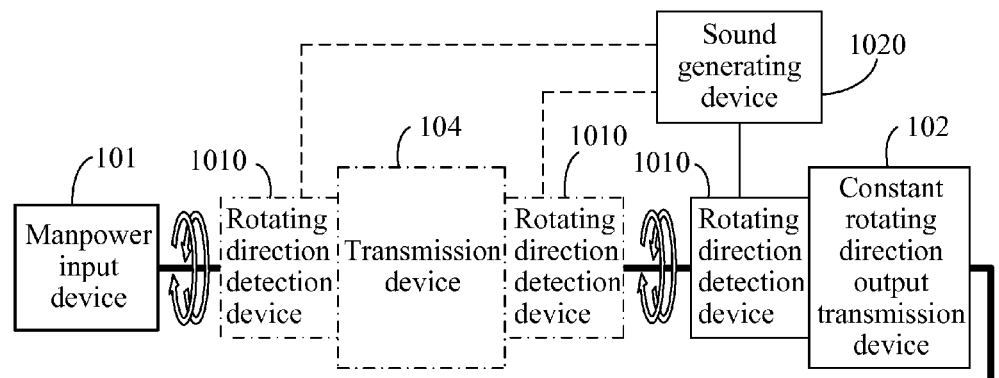
FIG. 6 is a structural block schematic view of the invention being applied in a manpower driven sport device having the loading wheel trains with operatively controllable damping.
Figure 6:
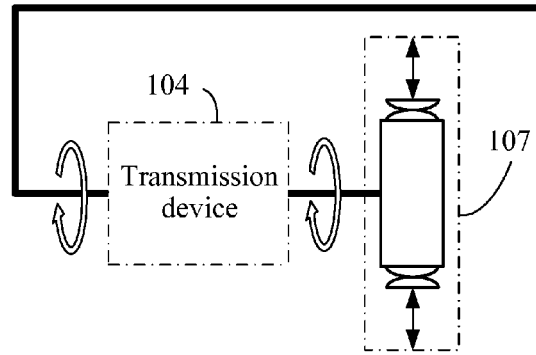

The main characteristic thereof is being installed with:

Rotating direction detection device (1010): which is a controlling structure having a rotating direction detection function and capable of actuating or terminating operations of the sound generating device (1020), and including a rotating direction detection device composed of a physical structure, e.g. a rotating direction detection structure composed of at least one of mechanical, electromechanical, photoelectric, or electromagnetic effects, said rotating direction detection device (1010) is installed in the driving device at the location capable of detecting the rider's driving direction;

Sound generating device (1020): constituted by one or more than one kind of following sound generating structures: 1) a mechanical sound generating device; 2) a sound generating device composed of power, solid electronic type sound simulation circuit and speakers; 3) a sound generating device capable of storing and playing sound signals; 4) a sound signal playing device connected through wireless internet; 5) a mechanical-driven device for generating sound; 6) a mechanical music box; 7) a sound generating device programmed with certain musical compositions which are repeatedly displayed; 8) a sound generating device programmed with two or more than two certain musical compositions; 9) a sound generating device in which sound being generated via random numbers, and being controlled by the rotating direction detection device for correspondingly generating sound while being driven at a certain rotating direction or generating different sounds while being bi-directionally driven;

The mentioned sound generating device (1020) includes fixed sound volume or adjustable sound volume;

The mentioned rotating direction detection device (1010) being connected with the sound generating device (1020) through one or more than one connections means which consists of:

1) the connection between the rotating direction detection device (1010) and the sound generating device (1020) includes a mechanical connection;
2) the connection between the rotating direction detection device (1010) and the sound generating device (1020) includes a connection via the electric power conductive member;
3) the connection between the rotating direction detection device (1010) and the sound generating device (1020) includes connections through wireless, radio frequency, optical or sound wave transmissions;
4) the rotating direction detection device (1010) and the sound generating device (1020) being integrally formed as a linked member for identifying direction and generating sound;
5) the rotating direction detection device (1010) and the sound generating device (1020) being integrally formed as a linked member, and including installed with a rotating direction identification single-way transmission device between the rotating input end and a beating stick, enabling a beat-to-sound part to generate sound through being beaten by the beating stick linked via setting the rotating direction;
6) the rotating direction detection device (1010) and the sound generating device (1020) being integrally formed as a linked member, and including a single-way transmission device installed between the rotating input end and a beat-to-sound part, enabling the beat-to-sound part to be linked at a certain rotating direction for hitting on a fixed beating stick for generating sound;

The manual driving device having functions of turning input direction and generating identification sound of the present invention can be further applied in manpower driven sport devices having operatively controllable damping devices, such as sporty exercising bicycles, as illustrated in FIG. 6 is a structural block schematic view of the invention being applied in a manpower driven sport device having loading wheel trains with operatively controllable damping, wherein it includes the constitution of the manpower input device (101) being driven by both or one of the human hand or foot and having at least one constant rotating direction output transmission device (102) with the input ends whereof to directly receive or through the transmission device (104) to receive the rotational kinetic energy output from the manpower input device (101), so that the loading wheel train with operatively controllable damping (107) is therefore directly driven or driven via the transmission device (104) by the rotational kinetic energy output of the constant rotating direction output from the output end of the constant rotating direction output transmission device (102), wherein the transmission device (104) includes the constitution of one or more than one kind of transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission, while the loading wheel train with operatively controllable damping (107) has the operatively controllable damping function to produce operatively controllable damping function during the operation of the sport device;

The operatively controllable damping of aforesaid loading wheel train with operatively controllable damping (107) includes the constitutions of friction type, fluid type, counter-torque of power generation output type, electrical counter-torque type, or electromagnetic eddy current generating type damping structures having operative control functions, etc. for operatively controlling the damping of the loading wheel train with operatively controllable damping (107).

The operatively controlled method of aforesaid loading wheel train with operatively controllable damping (107) is by means of the fluidic, mechanical or electrical operative control methods and devices according to the type of selected damping structure to operatively control the operatively controllable damping (107) for generating operatively controlled damping function.

Figure 7:
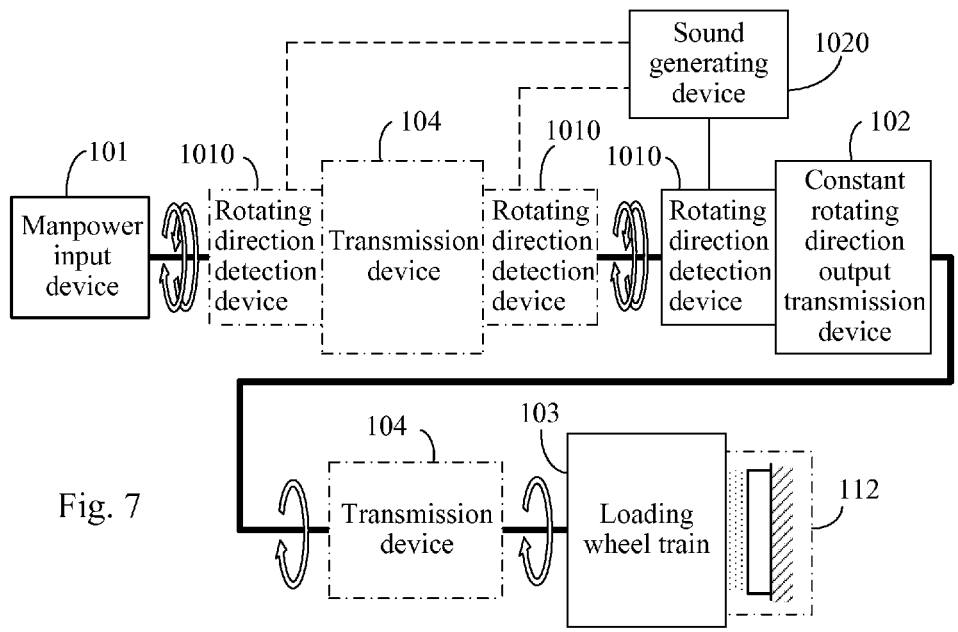
FIG. 7 is a structural block schematic view of the invention being applied in a manpower driven carrier which is externally installed with a fixed damping device for producing damping thereby constituting sport device functions.

The main characteristic thereof is being installed with:

Rotating direction detection device (1010): which is a controlling structure having a rotating direction detection function and capable of actuating or terminating operations of the sound generating device (1020), and including a rotating direction detection device composed of a physical structure, e.g. a rotating direction detection structure composed of at least one of mechanical, electromechanical, or photoelectric, electromagnetic effects, said rotating direction detection device (1010) is installed in the driving device at the location capable of detecting the rider's driving direction;

Sound generating device (1020): constituted by one or more than one kind of following sound generating structures: 1) a mechanical sound generating device; 2) a sound generating device composed of power, solid electronic type sound simulation circuit and speakers; 3) a sound generating device capable of storing and playing sound signals; 4) a sound signal playing device connected through wireless internet; 5) a mechanical-driven device for generating sound; 6) a mechanical music box; 7) a sound generating device programmed with certain musical compositions which are repeatedly displayed;

8) a sound generating device programmed with two or more than two certain musical compositions; 9) a sound generating device in which sound being generated via random numbers, and being controlled by the rotating direction detection device for correspondingly generating sound while being driven at a certain rotating direction or generating different sounds while being bi-directionally driven;

The mentioned sound generating device (1020) includes fixed sound volume or adjustable sound volume;

The mentioned rotating direction detection device (1010) being connected with the sound generating device (1020) through one or more than one connections means which consists of:

1) the connection between the rotating direction detection device (1010) and the sound generating device (1020) includes a mechanical connection;
2) the connection between the rotating direction detection device (1010) and the sound generating device (1020) includes a connection via the electric power conductive member;
3) the connection between the rotating direction detection device (1010) and the sound generating device (1020) includes connections through wireless, radio frequency, optical or sound wave transmissions;
4) the rotating direction detection device (1010) and the sound generating device (1020) being integrally formed as a linked member for identifying direction and generating sound;
5) the rotating direction detection device (1010) and the sound generating device (1020) being integrally formed as a linked member, and including installed with a rotating direction identification single-way transmission device between the rotating input end and a beating stick, enabling a beat-to-sound part to generate sound through being beaten by the beating stick linked via setting the rotating direction;
6) the rotating direction detection device (1010) and the sound generating device (1020) being integrally formed as a linked member, and including a single-way transmission device installed between the rotating input end and a beat-to-sound part, enabling the beat-to-sound part to be linked at a certain rotating direction for hitting on a fixed beating stick for generating sound;

The manual driving device having functions of turning input direction and generating identification sound of the present invention is through additionally externally installed with the fixed damping device (112) on the manpower driven carrier to produce damping effect with the loading wheel train (103) for conversion to sport device functional use; such as that FIG. 7 is a structural block schematic view of the invention being applied in a manpower driven carrier which is externally installed with a fixed damping device for producing damping thereby constituting sport device functions, wherein it includes the constitution of the manpower input device (101) being driven by both or one of the human hand or foot and having at least one constant rotating direction output transmission device (102) with the input ends whereof to directly receive or through the transmission device (104) to receive the rotational kinetic energy output from the manpower input device (101), so that the loading wheel train (103) is therefore directly driven or driven via the transmission device (104) by the rotational kinetic energy output of the constant rotating direction output from the output end of the constant rotating direction output transmission device (102), wherein the transmission device (104) includes the constitution of one or more than one kind of transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission;

The damping structure of the externally installed fixed damping device (112) on the loading wheel train (103) for producing damping effect includes the constitutions of friction type, fluid type, counter-torque of power generation output type, electrical counter-torque type, or electromagnetic eddy current generating type damping structures with operatively controllable characteristics, etc.

Figure 8:
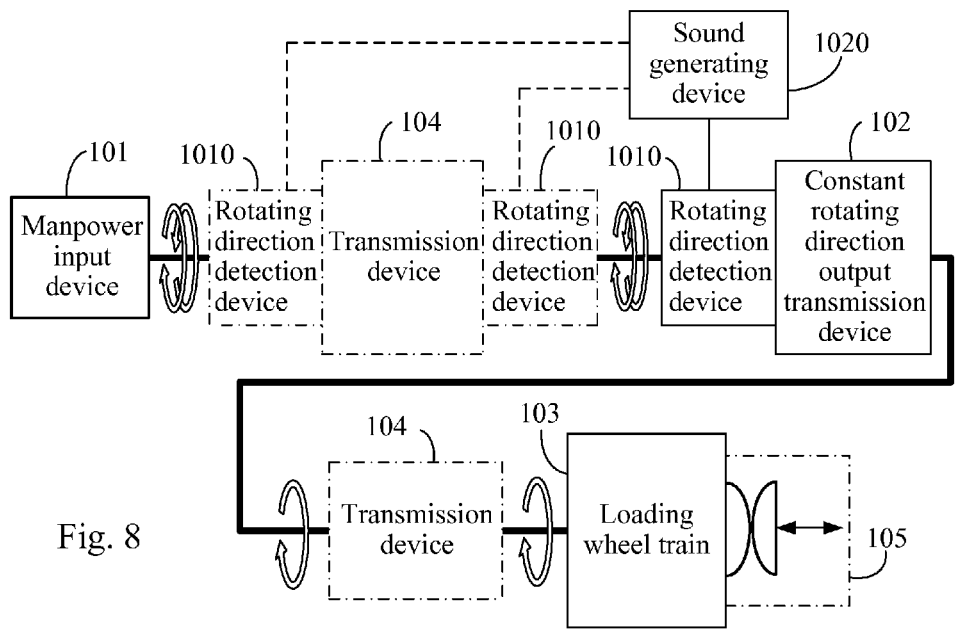
FIG. 8 is a structural block schematic view of the invention being applied in a manpower driven carrier which is externally installed with an operatively controllable damping device (105) thereby constituting sport device functions.

The main characteristic thereof is being installed with:

Rotating direction detection device (1010): which is a controlling structure having a rotating direction detection function and capable of actuating or terminating operations of the sound generating device (1020), and including a rotating direction detection device composed of a physical structure, e.g. a rotating direction detection structure composed of at least one of mechanical, electromechanical, photoelectric, or electromagnetic effects, said rotating direction detection device (1010) is installed in the driving device at the location capable of detecting the rider's driving direction;

Sound generating device (1020): constituted by one or more than one kind of following sound generating structures: 1) a mechanical sound generating device; 2) a sound generating device composed of power, solid electronic type sound simulation circuit and speakers; 3) a sound generating device capable of storing and playing sound signals; 4) a sound signal playing device connected through wireless internet; 5) a mechanical-driven device for generating sound; 6) a mechanical music box; 7) a sound generating device programmed with certain musical compositions which are repeatedly displayed; 8) a sound generating device programmed with two or more than two certain musical compositions; 9) a sound generating device in which sound being generated via random numbers, and being controlled by the rotating direction detection device for correspondingly generating sound while being driven at a certain rotating direction or generating different sounds while being bi-directionally driven;

The mentioned sound generating device (1020) includes fixed sound volume or adjustable sound volume;

The mentioned rotating direction detection device (1010) being connected with the sound generating device (1020) through one or more than one connections means which consists of:

1) the connection between the rotating direction detection device (1010) and the sound generating device (1020) includes a mechanical connection;
2) the connection between the rotating direction detection device (1010) and the sound generating device (1020) includes a connection via the electric power conductive member;
3) the connection between the rotating direction detection device (1010) and the sound generating device (1020)

includes connections through wireless, radio frequency, optical or sound wave transmissions;
4) the rotating direction detection device (1010) and the sound generating device (1020) being integrally formed as a linked member for identifying direction and generating sound;
5) the rotating direction detection device (1010) and the sound generating device (1020) being integrally formed as a linked member, and including installed with a rotating direction identification single-way transmission device between the rotating input end and a beating stick, enabling a beat-to-sound part to generate sound through being beaten by the beating stick linked via setting the rotating direction;
6) the rotating direction detection device (1010) and the sound generating device (1020) being integrally formed as a linked member, and including a single-way transmission device installed between the rotating input end and a beat-to-sound part, enabling the beat-to-sound part to be linked at a certain rotating direction for hitting on a fixed beating stick for generating sound;

The manual driving device having functions of turning input direction and generating identification sound of the present invention is through externally installed with an operatively controllable damping device (105) on the manpower driven carrier for conversion to sport device functional use; such as that FIG. 8 is a structural block schematic view of the invention being applied in a manpower driven carrier which is externally installed with an operatively controllable damping device (105) thereby constituting sport device functions, wherein it includes the constitution of the manpower input device (101) being driven by both or one of the human hand or foot and having at least one constant rotating direction output transmission device (102) with the input ends whereof to directly receive or through the transmission device (104) to receive the rotational kinetic energy output from the manpower input device (101), so that the loading wheel train (103) is therefore directly driven or driven via the transmission device (104) by the rotational kinetic energy output of the constant rotating direction output from output end of the constant rotating direction output transmission device (102), wherein the transmission device (104) includes the constitution of one or more than one kind of transmission devices of the following: 1) various gear-type, belt-type, friction-type fixed speed ratio or variable-speed ratio rotating type transmission functioning structure, or 2) a stepped or stepless variable speed device being operated manually, or by the mechanical force, or fluid force, or centrifugal force, or rotating torque or counter-rotating torque, or 3) the transmission device of the capability to operatively control the switching relationship of the relative rotating directions at the input end and output end, or 4) the clutch device or the single way clutch being operated manually, or by the mechanical force, or electromagnetic force, or fluid force, or centrifugal force, or rotating torque, or counter-rotating torque for connecting transmission or interrupting transmission, while the loading wheel train (103) is externally installed with at least one operatively controllable damping device (105) for producing the damping, so as to operatively control the damping during the sport device functional operation;

The damping structure of the externally installed operatively controllable damping device (105) includes the constitutions of friction type, fluid type, counter-torque of power generation output type, electrical counter-torque type, or electromagnetic eddy current generating type damping structures with operatively controllable characteristics, etc., wherein the damping capacity during sport device functional operation is operatively controlled via the fluidic, mechanical or electrical operative control methods and devices by the externally installed operatively controllable damping device (105) according to the type of selected damping structure.

The main characteristic thereof is being installed with:

Rotating direction detection device (1010): which is a controlling structure having a rotating direction detection function and capable of actuating or terminating operations of the sound generating device (1020), and including a rotating direction detection device composed of a physical structure, e.g. a rotating direction detection structure composed of at least one of mechanical, electromechanical, or photoelectric, electromagnetic effects, said rotating direction detection device (1010) is installed in the driving device at the location capable of detecting the rider's driving direction;

Sound generating device (1020): constituted by one or more than one kind of following sound generating structures: 1) a mechanical sound generating device; 2) a sound generating device composed of power, solid electronic type sound simulation circuit and speakers; 3) a sound generating device capable of storing and playing sound signals; 4) a sound signal playing device connected through wireless internet; 5) a mechanical-driven device for generating sound; 6) a mechanical music box; 7) a sound generating device programmed with certain musical compositions which are repeatedly displayed; 8) a sound generating device programmed with two or more than two certain musical compositions; 9) a sound generating device in which sound being generated via random numbers, and being controlled by the rotating direction detection device for correspondingly generating sound while being driven at a certain rotating direction or generating different sounds while being bi-directionally driven;

The mentioned sound generating device (1020) includes fixed sound volume or adjustable sound volume;

The mentioned rotating direction detection device (1010) being connected with the sound generating device (1020) through one or more than one connections means which consists of:
1) the connection between the rotating direction detection device (1010) and the sound generating device (1020) includes a mechanical connection;
2) the connection between the rotating direction detection device (1010) and the sound generating device (1020) includes a connection via the electric power conductive member;
3) the connection between the rotating direction detection device (1010) and the sound generating device (1020) includes connections through wireless, radio frequency, optical or sound wave transmissions;
4) the rotating direction detection device (1010) and the sound generating device (1020) being integrally formed as a linked member for identifying direction and generating sound;
5) the rotating direction detection device (1010) and the sound generating device (1020) being integrally formed as a linked member, and including installed with a rotating direction identification single-way transmission device between the rotating input end and a beating stick, enabling a beat-to-sound part to generate sound through being beaten by the beating stick linked via setting the rotating direction;
6) the rotating direction detection device (1010) and the sound generating device (1020) being integrally formed as a linked member, and including a single-way transmission device installed between the rotating input end and a beat-to-sound part, enabling the beat-to-sound part to be linked at a certain rotating direction for hitting on a fixed beating stick for generating sound;

In the manual driving device having functions of turning input direction and generating identification sound of the present invention, a rotating direction detection device (1010) is provided; the rotating direction detection device (1010) is a controlling structure having a rotating direction detecting function and capable of actuating or terminating the operations of the sound generating device (1020), and including a rotating direction detection device composed of at least one of mechanical, electromechanical, or photoelectric, electromagnetic effects, the mentioned rotating direction detection device (1010) is installed at the position of the driving device capable of detecting the rider's driving direction.

In the manual driving device having functions of turning input direction and generating identification sound of the present invention, the sound generating device (1020) is controlled to generate a certain sound when driven in one rotating direction.

In the manual driving device having functions of turning input direction and generating identification sound of the present invention, different sounds are generated during different rotating direction drives.

In the manual driving device having functions of turning input direction and generating identification sound of the present invention, the sound generating device (1020) includes a mechanical sound generating device.

In the manual driving device having functions of turning input direction and generating identification sound of the present invention, the sound generating device (1020) includes a sound generating device composed of power, solid electronic type sound simulation circuit and speakers.

In the manual driving device having functions of turning input direction and generating identification sound of the present invention, the sound generating device (1020) includes a sound generating device capable of storing and playing sound signals.

In the manual driving device having functions of turning input direction and generating identification sound of the present invention, the sound generating device (1020) includes a sound signal playing device connected through wireless internet.

In the manual driving device having functions of turning input direction and generating identification sound of the present invention, the sound generating device (1020) includes a mechanical-driven device for generating sound.

In the manual driving device having functions of turning input direction and generating identification sound of the present invention, the mechanical-driven device for generating sound includes a music box.

In the manual driving device having functions of turning input direction and generating identification sound of the present invention, the sound generating device (1020) includes a sound programmed with certain musical composition repeatedly displayed.

In the manual driving device having functions of turning input direction and generating identification sound of the present invention, the sound generating device (1020) includes two or more than two certain musical compositions that generate different sound.

In the manual driving device having functions of turning input direction and generating identification sound of the present invention, the sound generating device (1020) includes sound generated by random numbers.

In the manual driving device having functions of turning input direction and generating identification of the present invention, the sound generating device (1020) includes a function of adjusting the volume.

In the manual driving device having functions of turning input direction and generating identification sound of the present invention, the rotating direction detection device (1010) includes a mechanical structure for detecting the rotating direction of the input end of the constant rotating direction output transmission device (102).

In the manual driving device having functions of turning input direction and generating identification sound of the present invention, the rotating direction detection device (1010) includes a mechanical structure, for detecting the rotating direction of the input end or the output end of the transmission device (104).

In the manual driving device having functions of turning input direction and generating identification sound of the present invention, the rotating direction detection device (1010) includes an electromagnetic coupling structure for detecting the rotating direction of the input end of the constant rotating direction output transmission device (102).

In the manual driving device having functions of turning input direction and generating identification sound of the present invention, the rotating direction detection device (1010) includes an electromagnetic coupling structure for detecting the rotating direction of the input end or the output end of the transmission device (104).

In the manual driving device having functions of turning input direction and generating identification sound of the present invention, the rotating direction detection device (1010) includes non-contact type, photoelectric, electromagnetic and electromagnetic inductive type structures for detecting the rotating direction of the input end of the constant rotating direction output transmission device (102).

In the manual driving device having functions of turning input direction and generating identification sound of the present invention, the rotating direction detection device (1010) includes non-contact type, photoelectric, electromagnetic and electromagnetic inductive type structures for detecting the rotating direction of the input end or the output end of the transmission device (104).

In the manual driving device having functions of turning input direction and generating identification sound of the present invention, the connection between the rotating direction detection device (1010) and the sound generating device (1020) includes a mechanical connection.

In the manual driving device having functions of turning input direction and generating identification sound of the present invention, the connection between the rotating direction detection device (1010) and the sound generating device (1020) includes a connection through the electric power conductive member.

In the manual driving device having functions of turning input direction and generating identification sound of the present invention, the rotating direction detection device (1010) includes connections through wireless, radio frequency, optical or sound wave transmissions.

In the manual driving device having functions of turning input direction and generating identification sound of present invention, the rotating direction detection device (1010) and the sound generating device (1020) being integrally formed as a linked member for identifying direction and generating sound.

In the manual driving device having functions of turning input direction and generating identification sound of the present invention, the rotating direction detection device (1010) and the sound generating device (1020) being integrally formed as a linked member, and including installed with a rotating direction identification single-way transmission device between the rotating input end and a beating stick, enabling a beat-to-sound part to generate sound through being beaten by the beating stick linked via setting the rotating direction.

In the manual driving device having functions of turning input direction and generating identification sound of the present invention, the rotating direction detection device (1010) and the sound generating device (1020) being integrally formed as a linked member, and including a single-way transmission device installed between the rotating input end and a beat-to-sound part, enabling the beat-to-sound part to be linked at a certain rotating direction for hitting on a fixed beating stick for generating sound.

The invention claimed is:

1. A manual driving device having a bi-directional input and that generates sound in response to a driving direction, comprising:
    a foot or hand driven input device (101) for receiving a rotary input in either of two directions or a reciprocating rotary input;
    a constant output direction transmission device (102) for receiving a bi-directional input from the foot or hand driven input device (101) and producing a constant direction output having only one rotational direction, wherein a speed ratio between an input end and an output end of the constant output direction transmission device is fixed or variable;
    a load connected to be directly or indirectly driven by the constant output direction transmission device;
    a rotating direction detection device (1010) for detecting a direction of the bi-directional input to the constant output direction transmission device (102); and
    a sound generating device (1020) connected to and actuated by the rotating direction detection device (1010) to generate sound and terminate sound generation depending on said direction of the bi-directional input.

2. A manual driving device having a bi-directional input and that generates sound in response to a driving direction as claimed in claim 1, wherein the sound generating device (1020) generates different sounds in different directions of the bi-directional input.

3. A manual driving device having a bi-directional input and that generates sound in response to a driving direction as claimed in claim 1, wherein the sound generating device (1020) generates sound in a first direction of the bi-directional input and does not generate sound in a second direction of the bi-directional input.

4. A manual driving device having a bi-directional input and that generates sound in response to a driving direction as claimed in claim 1, wherein the rotating direction detecting device (1010) comprises at least one of a mechanical, electromechanical, photoelectric, and electromagnetic rotating direction detection structure.

5. A manual driving device having a bi-directional input and that generates sound in response to a driving direction as claimed in claim 1, wherein the sound generating device (1020) includes at least one of: (a) a mechanical sound generating device; (b) a sound generating device including a power source, a solid state sound simulation circuit, and speakers; (c) a sound generating device arranged to store and play sound signals (d) a sound playing device connected through a wireless network connection; (e) a mechanically-driven sound generating device; (f) a music box; (g) a sound generating device programmed with musical compositions that are repeatedly played; (h) a sound generating device programmed with two or more musical compositions; and (i) a sound generating device that uses random numbers to generate sound.

6. A manual driving device having a bi-directional input and that generates sound in response to a driving direction as claimed in claim 1, wherein the sound generating device (1020) has one of a fixed and adjustable volume.

7. A manual driving device having a bi-directional input and that generates sound in response to a driving direction as claimed in claim 1, wherein the sound generating device (1020) is connected to the rotating direction detection device (1010) by at least one of a mechanical connection, an electricity conducting member, and a wireless connection.

8. A manual driving device having a bi-directional input and that generates sound in response to a driving direction as claimed in claim 1, wherein the rotating direction detection device (1010) and sound generating device are integrally formed as a linked member that moves in accordance with a rotating direction and generates sound as a result of the movement.

9. A manual driving device having a bi-directional input and that generates sound in response to a driving direction as claimed in claim 8, wherein the linked member is a stick that generates a beating sound as it moves in accordance with the rotating direction.

10. A manual driving device having a bi-directional input and that generates sound in response to a driving direction as claimed in claim 9, further comprising a single-way transmission installed between a rotating input end of the constant output rotating transmission device (102) and the linked member.

11. A manual driving device having a bi-directional input and that generates sound in response to a driving direction as claimed in claim 1, further comprising an input transmission device (104) connected between the foot or hand driven input device (101) and the constant rotating direction output transmission device (102).

12. A manual driving device having a bi-directional input and that generates sound in response to a driving direction as claimed in claim 11, wherein the rotating direction detecting device (1010) is coupled to one of an input and an output of the input transmission device (104).

13. A manual driving device having a bi-directional input and that generates sound in response to a driving direction as claimed in claim 11, wherein the input transmission device (104) is at least one of the following transmission devices: (a) a gear, belt, or friction type transmission structure; (b) a stepped or stepless variable speed device that is controlled manually, automatically controlled by one of mechanical, fluid, centrifugal force, or automatically controlled in response to rotating or counter-rotating torque; (c) a transmission device arranged to operatively control a switching relationship between the rotating directions at an input end and an output end of the input transmission device (104); and (d) a manually or automatically operated clutch device.

14. A manual driving device having a bi-directional input and that generates sound in response to a driving direction as claimed in claim 11, further comprising an output transmission device connected between the constant rotating direction output transmission device (102) and the load wheel train (103).

15. A manual driving device having a bi-directional input and that generates sound in response to a driving direction as claimed in claim 1, further comprising an output transmission device (104) connected between the constant rotating direction output transmission device (102) and the load wheel train (103).

16. A manual driving device having a bi-directional input and that generates sound in response to a driving direction as claimed in claim 15, wherein the output transmission device (104) is at least one of the following transmission devices: (a) a gear, belt, or friction type transmission structure; (b) a stepped or stepless variable speed device that is controlled manually, automatically controlled by one of mechanical, fluid, centrifugal force, or automatically controlled in response to rotating or counter-rotating torque; (c) a transmission device arranged to operatively control a switching relationship between the rotating directions at an input end and an output end of the input transmission device (104); and (d) a manually or automatically operated clutch device.

17. A manual driving device having a bi-directional input and that generates sound in response to a driving direction as claimed in claim 1, wherein the load is a load wheel train (103).

18. A manual driving device having a bi-directional input and that generates sound in response to a driving direction as claimed in claim 1, wherein the load includes a load wheel train and fixed damping structure (106) including one of a friction type, fluid type, power generation type, electrical counter-torque type or electromagnetic eddy current generating type damping structure.

19. A manual driving device having a bi-directional input and that generates sound in response to a driving direction as claimed in claim 1, wherein, further comprising a load wheel train and an operatively controllable load damping device (107) comprising at least one of a friction type, fluid type, power generation type, electrical counter-torque type or electromagnetic eddy current generating type damping device, said operatively controllable damping device being controlled by fluidic, mechanical or electrical power.

20. A manual driving device having a bi-directional input and that generates sound in response to a driving direction as claimed in claim 1, wherein the load includes a load wheel train and at least one of an externally installed friction type, fluid type, power generation type, electrical counter-torque type, or electromagnetic eddy current generating type fixed damping device (112).

21. A manual driving device having a bi-directional input and that generates sound in response to a driving direction as claimed in claim 1, wherein the load includes a load wheel train and an externally installed operatively controllable load damping device (105) comprising at least one of a friction type, fluid type, power generation type, electrical counter-torque type or electromagnetic eddy current generating type damping device, said operatively controllable damping device being controlled by fluidic, mechanical or electrical power.

* * * * *